(12) United States Patent
Oike

(10) Patent No.: US 9,791,104 B2
(45) Date of Patent: Oct. 17, 2017

(54) FLOAT TYPE DRAIN TRAP

(71) Applicant: TLV CO., LTD., Hyogo (JP)

(72) Inventor: Tadashi Oike, Hyogo (JP)

(73) Assignee: TLV Co., Ltd., Hyogo (JP)

( * ) Notice: Subject to any disclaimer, the term of this patent is extended or adjusted under 35 U.S.C. 154(b) by 0 days.

(21) Appl. No.: 14/411,267

(22) PCT Filed: Jul. 1, 2013

(86) PCT No.: PCT/JP2013/068024
§ 371 (c)(1),
(2) Date: Dec. 24, 2014

(87) PCT Pub. No.: WO2014/007206
PCT Pub. Date: Jan. 9, 2014

(65) Prior Publication Data
US 2015/0192248 A1      Jul. 9, 2015

(30) Foreign Application Priority Data
Jul. 2, 2012 (JP) ................. 2012-148940

(51) Int. Cl.
*F16T 1/20* (2006.01)
*F16T 1/38* (2006.01)
*F16T 1/22* (2006.01)

(52) U.S. Cl.
CPC ...... *F16T 1/20* (2013.01); *F16T 1/22* (2013.01); *F16T 1/38* (2013.01); *F16T 1/386* (2013.01); *Y10T 137/3071* (2015.04)

(58) Field of Classification Search
CPC ... F16T 1/20; F16T 1/386; F16T 1/383; F16T 1/22; Y10T 137/30712; Y10T 137/3034;
(Continued)

(56) References Cited

U.S. PATENT DOCUMENTS

2007/0102450 A1* 5/2007 Stiers ............. B01F 11/04
222/181.1
2010/0126591 A1* 5/2010 Oike ............ F16K 24/046
137/15.05

FOREIGN PATENT DOCUMENTS

JP  2008-121873   5/2008
JP  2009-222123   10/2009
(Continued)

OTHER PUBLICATIONS

International Search Report, dated Jul. 23, 2013, issued in corresponding International Application No. PCT/JP2013/068024.

*Primary Examiner* — Mary McManmon
*Assistant Examiner* — Patrick Williams
(74) *Attorney, Agent, or Firm* — The Webb Law Firm

(57) ABSTRACT

A float type drain trap in which an inlet, a valve chamber, and an outlet are formed in a valve casing, a valve seat member, a discharge passage, a float, an operation member, a valve member that communicates between the periphery anterior to and the periphery posterior to the middle portion of the operation member when the operation member is in the advanced position and that blocks the periphery anterior to and the periphery posterior to the middle portion of the operation member from one another when the operation member is in the most retracted position is provided to the middle portion of the operation member, and a blow passage formed to communicate the periphery posterior to the valve member of the operation member with the outside distinct from the outlet.

2 Claims, 2 Drawing Sheets

(58) Field of Classification Search
CPC ......... Y10T 137/3105; Y10T 137/4336; Y10T 137/4351
See application file for complete search history.

(56) References Cited

FOREIGN PATENT DOCUMENTS

| | | |
|---|---|---|
| JP | 2009-257435 | 11/2009 |
| JP | 2010-144758 | 7/2010 |
| JP | 2011-038608 | 2/2011 |
| WO | 2008/107967 | 9/2008 |

* cited by examiner

FLOAT TYPE DRAIN TRAP

TECHNICAL FIELD

The present invention relates to a float type drain trap that automatically discharges the condensate generated in steam, compressed air, and a gas piping system by floatation and drop of a float, particularly to one that can clean foreign material in fluid, the material being adhered to a valve seat member from and on which a float is moved away and seated.

BACKGROUND ART

A conventional float type drain trap is disclosed in Patent Literature 1, for example. This is such that an inlet port, a valve chamber, and an outlet are formed in a valve casing, a valve seat member is attached to the lower portion of the valve chamber, a discharge passage that communicates the valve chamber with the outlet side is formed to the valve seat member, a float that is moved away from and seated on the valve seat member to open and close the discharge passage is disposed in the valve chamber, an operation member whose tip end is disposed in the discharge passage is provided to be externally operable in the forward and backward directions, and a valve member that blocks the periphery anterior to and the periphery posterior to the middle portion of the operation member from one another when the operation member is in the most retracted position is provided in the middle portion of the operation member.

PRIOR ART LITERATURES

Patent Literatures

Patent Literature 1: Japanese Unexamined Patent Application Publication No. 2008-121873

SUMMARY OF INVENTION

Technical Problem

The above conventional float type drain trap that cleans foreign material adhered to the inner surface of the tip end of the discharge passage by advancing the operation member. The foreign material that has flowed downward through the discharge passage by cleaning flows downward toward the outlet. Accordingly, a large amount of foreign material may be mixed in a recovery condensate when condensate recovery piping is connected to the outlet to reuse condensate.

Therefore, the problem to be solved by the present invention is to provide a float type drain trap in which a large amount of removed foreign material does not flow downward toward the outlet.

Solution to Problem

To solve the above problem, the characteristics of a float type drain trap of the present invention are as follows. An inlet, a valve chamber, and an outlet are formed in a valve casing. A valve seat member is attached to the lower portion of the valve chamber. A discharge passage that communicates the valve chamber with the outlet side is formed to the valve seat member. A float that is moved away from and seated on the valve seat member to open and close the discharge passage is disposed in the valve chamber. An operation member whose tip end is disposed in the discharge passage is provided to be externally operable in the forward and backward directions. A valve member is provided in the middle portion of the operation member to communicate between the periphery anterior to and the periphery posterior to the middle portion of the operation member when the operation member is in the advanced position and to block the periphery anterior to and the periphery posterior to the middle portion of the operation member from one another when the operation member is in the most retracted position. A blow passage is provided to communicate the periphery posterior to the valve member of the operation member with an outside distinct from the outlet.

Advantageous Effect of Invention

According to the present invention, by providing the blow passage to communicate the periphery posterior to the valve member of the operation member with the outside distinct from the outlet, removed foreign material can be blown outside from the blow passage. As a result, an advantageous effect that a large amount of removed foreign materials do not flow downward toward the outlet is obtained.

EMBODIMENTS FOR CARRYING OUT INVENTION

Figure 1:
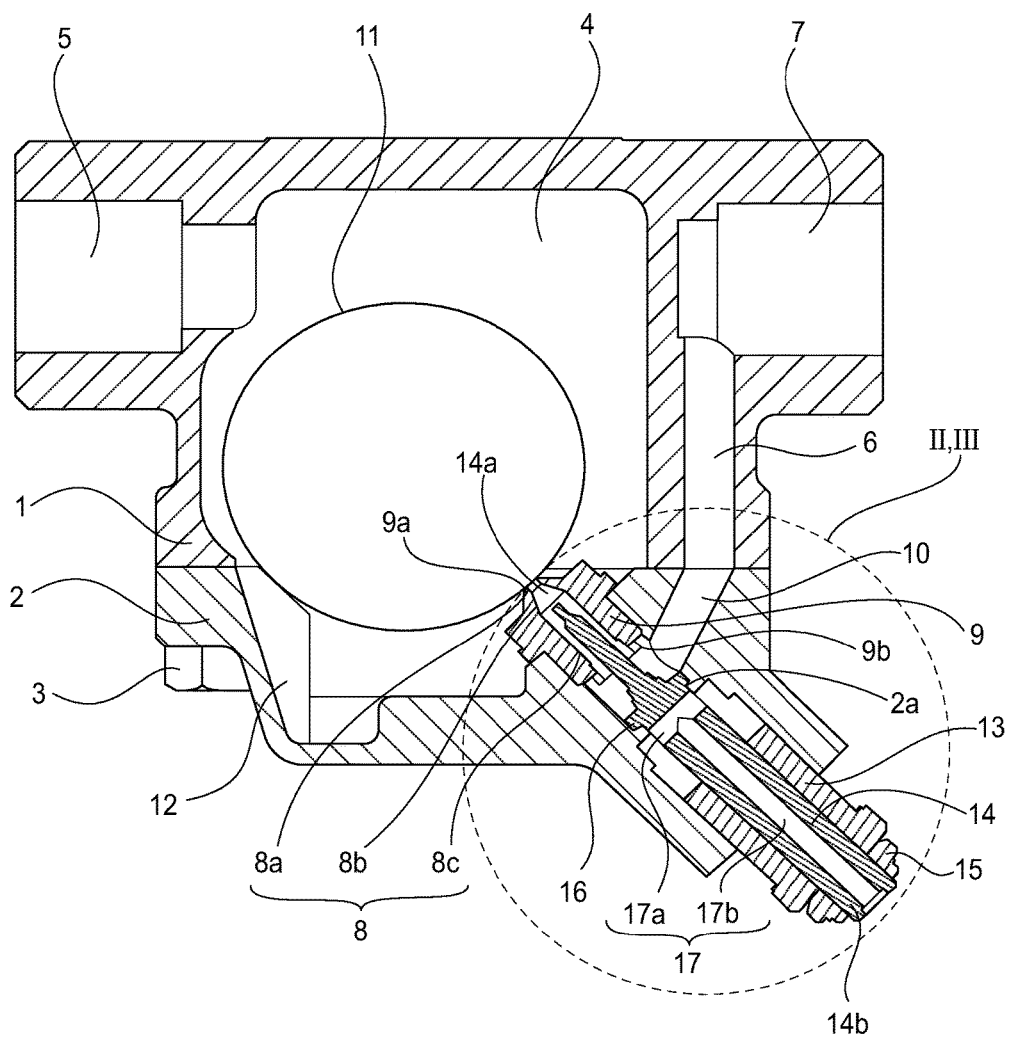
FIG. 1 is a sectional view of a float type drain trap of an embodiment of the present invention.

Hereafter, an embodiment of the invention is described with reference to FIG. 1. A cover 2 is fastened to a body 1 by use of a bolt 3 to form a valve casing, inside which a valve chamber 4 is formed. The body 1 has an inlet 5, an outlet passage 6, and an outlet 7. The inlet 5 communicates with the upper portion of the valve chamber 4. The inlet 5 and outlet 7 are formed coaxially. A valve seat member 9 having a discharge passage 8 opened therethrough is threadably coupled to the cover 2 in the lower portion of the valve chamber 4. The discharge passage 8 includes a tip end 8a that is an end toward the valve chamber 4 and has a small diameter, a tapered portion 8b whose diameter expands toward the downstream of the downstream of the tip end 8a, and a rear end 8c having a large diameter and downstream of the tapered portion 8b. The cover 2 has an outlet passage 10. The lower portion of the valve chamber 4 communicates with the outlet 7 from the discharge passage 8 via the outlet passages 10 and 6. In the valve chamber 4, a float 11 having a hollow spherical shape is located in a free state to open and close the discharge passage 8 by being moved away from and seated on a valve-chamber side end surface 9a of the valve seat member 9. Two float seats 12 that contact with the float 11 where the float 11 closes the discharge passage 8 are formed below the float 11 at the near side and other side of the FIGURE.

A plug 13 is screwed to the cover 2 coaxially with the valve seat member 9 to be adjustable forwardly and backwardly from the outside. The operation member 14 is secured to the plug 13 coaxially with the valve seat member 9 by use of a U nut 15 as a connecting member to penetrate the plug 13. A tip end 14a of the operation member 14 is located downstream of the tip end 8a of the discharge passage 8 and projects into the valve chamber 4 by advance, and a rear end 14b thereof is located outside. The outer diameter of the tip end 14a of the operation member 14 is formed slightly smaller than the inner diameter of the tip end 8a of the discharge passage 8. When the operation member 14 is advanced, the inner surface of the tip end 8a of the discharge passage 8 is cleaned by the tip end 14a of the operation member 14. A flange-like valve member 16 is formed integrally with the middle portion of the operation member 14. Inside the operation member 14, a blow passage 17 is provided including a transverse hole 17a radially penetrating at the portion posterior to the valve member 16 and a longitudinal hole 17b that communicates with this transverse hole 17a and axially penetrates toward the rear end. The blow passage 17 communicates the periphery posterior to the valve member 16 of the operation member 14 with the open air distinct from the outlet 7. The blow passage may communicate the periphery posterior to the valve member 16 of the operation member 14 with a condensate pit and a condensate tank that are distinct from the outlet 7. The valve member 16 is moved away from and seated on a rear end 9b of the valve seat member 9 to close the discharge passage 8 at the most advanced position and to open the discharge passage 8 at the position retracted from the most advanced position. The valve member 16 is moved away from and seated on an inward flange 2a of the cover 2 to communicate between the periphery anterior to and the periphery posterior to the valve member 16 of the operation member 14 from the most advanced position to the most retracted position and to block the periphery anterior to and the periphery posterior to the valve member 16 of the operation member 14 from one another at the most retracted position. The blow passage may be provided not in the operation member 14 but in the plug 13 or cover 2.

In the state of FIG. 1, the condensate flowed from the inlet 5 collects in the valve chamber 4, the float 11 floats and drops in response to the liquid level and is moved away from and seated on the valve seat member 9 to open and close the discharge passage 8. When the discharge passage 8 is opened, the condensate in the valve chamber 4 is discharged to the outlet 7 through the discharge passage 8 and the outlet passages 6 and 10. When the discharge passage 8 is closed, the leakage of the gas in the valve chamber 4 is prevented.

Figure 2:
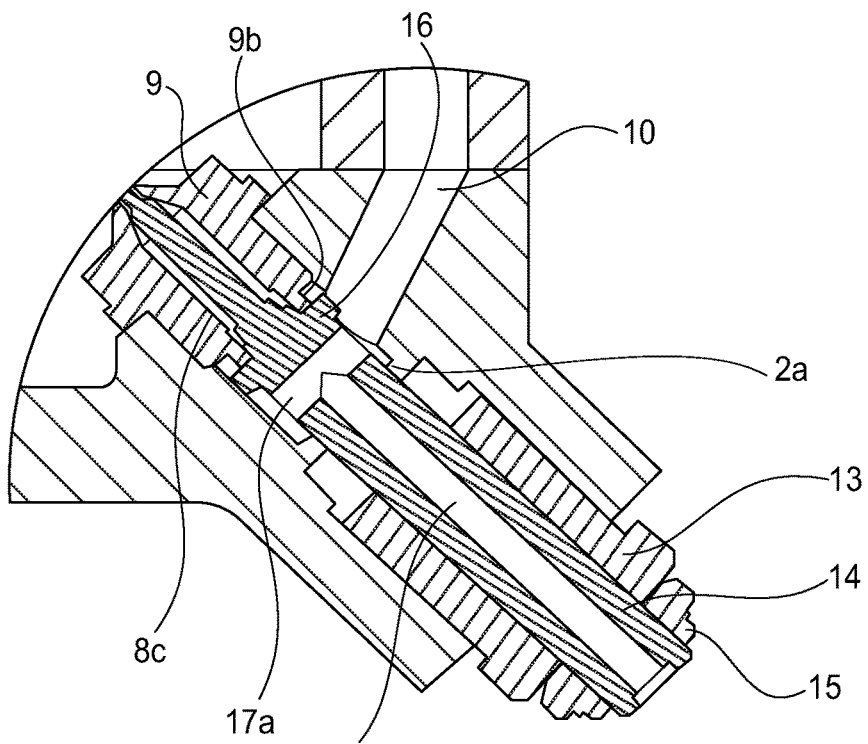
FIG. 2 is an enlarged view of area II, III shown in FIG. 1 illustrating the operation member in an advanced position.
Figure 3:
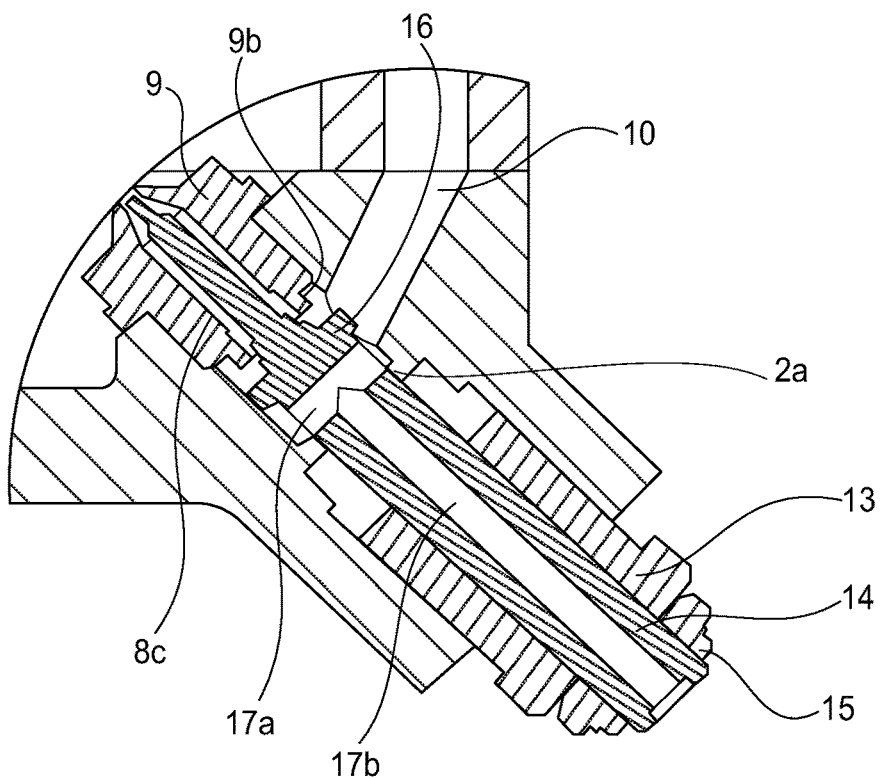
FIG. 3 is an enlarged view of area II, III shown in FIG. 1 illustrating the operation member in a retracted position.

When the foreign material adhered to the inner surface of the tip end 8a of the discharge passage 8 of the valve seat member 9 is removed, the plug 13 is screwed to rotate and advance the operation member 14 to the position illustrated in FIG. 2. Then, as shown in FIG. 2, the operation member 14 is advanced to the position where the valve member 16 of the operation member 14 is seated on the rear end of the valve seat member 9 to close the discharge passage 8 (preferably, to the most advanced position). Thereby, the tip end 14a of the operation member 14 cleans the inner surface of the tip end 8a of the discharge passage 8 of the valve seat member 9. Then, the plug 13 is unscrewed to rotate and retract the operation member 14 to the position illustrated in FIG. 3 to open the discharge passage 8 after the liquid level in the valve chamber 4 is raised. Accordingly, the fluid containing the foreign material that has entered the periphery posterior to the valve member 16 of the operation member 14 is blown to the open air distinct from the outlet 7 through the blow passage 17 provided inside the operation member 14. Thereby, the removed foreign material flowing down to the outlet 7 can be made small. After that, the plug 13 is further unscrewed to rotate and retract the operation member 14 to the most retracted position illustrated in FIG. 1 and to block the periphery anterior to and the periphery posterior to the valve member 16 of the operation member 14 from one another.

INDUSTRIAL APPLICABILITY

The present invention is usable for float type drain traps that automatically discharge the condensate generated in steam, compressed air, and gas piping systems.

DESCRIPTION OF REFERENCE NUMERALS

1 . . . Body
2 . . . Cover
2a . . . Inward flange of cover
4 . . . Valve chamber
5 . . . Inlet
6,10 . . . Outlet passage
7 . . . Outlet
8 . . . Discharge passage
8a . . . Tip end of discharge passage
9 . . . Valve seat member
9a . . . Valve-chamber side end surface of valve seat member
9b . . . Rear end of valve seat member
11 . . . Float
13 . . . Plug
14 . . . Operation member
14a . . . Tip end of operation member
14b . . . Rear end of operation member
15 . . . U nut
16 . . . Valve member
17 . . . Blow passage
17a . . . Transverse hole
17b . . . Longitudinal hole

The invention claimed is:

1. A float type drain trap comprising:
an inlet, a valve chamber, and an outlet are formed in a valve casing,
a valve seat member is attached to a lower portion of the valve chamber,
a discharge passage that communicates the valve chamber with the outlet is formed to the valve seat member,
a float that is moved away from and seated on the valve seat member to open and close the discharge passage is disposed on the valve chamber,
an operation member whose tip end is disposed in the discharge passage is provided to be externally operable in forward and backward directions,
a valve member formed at a middle portion of the operation member, the valve member being configured to selectively communicate a periphery anterior to the valve member with a periphery posterior to the valve member, and
a blow passage that communicates the periphery posterior to the valve member with an exterior of the valve casing distinct from the outlet while the operation member is contactingly engaged to the interior of the valve casing,
wherein the operation member is movable between an advanced position in which the valve member engages the valve seat member and blocks communication between the periphery anterior to the valve member and the periphery posterior to the valve member, a retracted position in which the valve member communicates the periphery anterior to the valve member and the periphery posterior to the valve member to allow fluid to flow through the blow passage to the exterior of the valve casing, and a most retracted position in which the valve member engages the valve casing and blocks communication between the periphery anterior to the valve member and the periphery posterior to the valve member, and wherein operation member is configured to direct fluid containing foreign matter away from the outlet and to the exterior of the valve casing via the blow passage when the operation member is in the retracted position.

2. The float type drain trap according to claim 1 wherein the blow passage is provided inside the operation member.

* * * * *